United States Patent [19]

Choy et al.

[11] Patent Number: 5,551,027
[45] Date of Patent: Aug. 27, 1996

[54] MULTI-TIERED INDEXING METHOD FOR PARTITIONED DATA

[75] Inventors: David M. Choy, Los Altos; Chandrasekaran Mohan, San Jose, both of Calif.

[73] Assignee: International Business Machines Corporation, Armonk, N.Y.

[21] Appl. No.: 526,723

[22] Filed: Sep. 11, 1995

Related U.S. Application Data

[63] Continuation of Ser. No. 1,491, Jan. 7, 1993, abandoned.

[51] Int. Cl.[6] ............................. G06F 9/355; G06F 12/00
[52] U.S. Cl. .................. 395/600; 395/497.04; 395/456; 395/480; 395/416; 395/421.06; 364/DIG. 1; 364/246.3; 364/246.8; 364/247.5; 364/255.2
[58] Field of Search ................................. 395/600, 497.04, 395/456, 480, 416, 421.06; 364/DIG. 1

[56] References Cited

U.S. PATENT DOCUMENTS

| | | | |
|---|---|---|---|
| 4,468,728 | 8/1984 | Wang | 395/600 |
| 4,811,199 | 3/1989 | Kuechler et al. | 364/200 |
| 4,853,843 | 8/1989 | Ecklund | 395/600 |
| 4,914,569 | 4/1990 | Levine et al. | 364/200 |
| 4,933,848 | 6/1990 | Haderle et al. | 364/300 |
| 4,937,760 | 6/1990 | Beitel et al. | 364/513 |
| 4,961,134 | 10/1990 | Crus et al. | 364/200 |
| 4,961,139 | 10/1990 | Hong | 395/600 |
| 5,058,002 | 10/1991 | Nakamura et al. | 364/200 |
| 5,093,911 | 3/1992 | Parks et al. | 395/600 |

(List continued on next page.)

OTHER PUBLICATIONS

C. Mohan, Commit LSN: A Novel and Simple Method for Reducing Locking and Latching in Transaction Processing Systems, Proceedings of the 16th VLDB Conf. Brisbane, Australia, Aug. 1990.

C. Mohan, ARIES/KVL: A Key–Value Locking Method for Concurrency Control of Multiaction Transactions Operating on B–Tree Indexes, Proceedings of the 16th VLDB Conference, Brisbane, Australia, Aug. 1990.

C. Mohan et al., ARIES/IM: An Efficient and High Concurrency Index Management Method Using Write–Ahead Logging, Proc. SIGMOND International Conference on Management of Data, San Diego, Jun. 1992.

C. Mohan et al., Single Table Access Using Multiple Indexes: Optimization, Execution, and Concurrency Control Techniques, Data Base Technology Institute, IBM Almaden and Data Base Technology Institute IBM Santa Teresa Lab, San Jose, pp. 29–42.

D. M. Choy et al., An Efficient Indexing Method for Partitioned Data, to be presented at 9th International Conf. on Data Engineering, Apr. 21, 1993–Apr. 23, 1993 at Vienna, Austria.

Primary Examiner—Thomas G. Black
Assistant Examiner—Jean R. Homere
Attorney, Agent, or Firm—James C. Pintner; Philip E. Blair

[57] ABSTRACT

A multi-tiered indexing method is disclosed for a partitioned table in a parallel or distributed database system. A Local Index is created and maintained for each partition of the table and a Coarse Global Index is created and maintained. The Coarse Global Index identifies the indexed partition(s) by partition identifiers (PIDs) and associates the individual Index Key Values with their target partitions so that an access request with a highly partition-selective search predicate on the Index Key can be quickly and easily directed to the target partition(s) for processing. An index maintenance locking protocol is also disclosed which handles the insertion and deletion of index entries and assures the consistency between the Local Index entries and the Coarse Global Index entries during concurrent index accesses by different transactions. The locking protocol minimizes locking only to those cases involving an inserted or deleted key and to the key following and possibly the key preceding the inserted or deleted key to allow high concurrency between simultaneous Readers, Inserters, and Deleters. This method enhances the efficiency of complex query evaluation and index maintenance and attains a high throughput for transaction processing.

11 Claims, 2 Drawing Sheets

U.S. PATENT DOCUMENTS

| | | | |
|---|---|---|---|
| 5,247,672 | 9/1993 | Mohan | 395/600 |
| 5,261,088 | 11/1993 | Baird | 395/600 |
| 5,293,616 | 3/1994 | Flint | 395/600 |
| 5,301,286 | 4/1994 | Rajani | 395/600 |
| 5,442,784 | 8/1995 | Powers et al. | 395/600 |
| 5,499,359 | 3/1996 | Vijaykumar | 395/600 |
| 5,511,190 | 4/1996 | Sharma et al. | 395/600 |

| RID | EMPLOYEE NAME | EMPLOYEE NUMBER | LOCATION | PID |
|---|---|---|---|---|
| 8 | ADAMS | 1 | SAN JOSE | 02 |
| 17 | ADAMS | 3 | WATSON | 03 |
| 23 | ANDREW | 7 | SAN JOSE | 02 |
| 19 | BAKER | 4 | ALMADEN | 01 |
| 4 | BLAIR | 19 | SAN JOSE | 02 |
| 11 | CUMMINGS | 13 | WATSON | 03 |
| 15 | ELLIOTT | 2 | WATSON | 03 |
| 21 | HOWARD | 5 | WATSON | 03 |
| 37 | HOWARD | 11 | SAN JOSE | 02 |
| 12 | HOWARD | 6 | SAN JOSE | 02 |
| 18 | JONES | 8 | ALMADEN | 01 |

| PID – 01 (ALMADEN) | | PID – 02 (SAN JOSE) | | PID – 03 (WATSON) | |
|---|---|---|---|---|---|
| NAME | RID | NAME | RID | NAME | RID |
| BAKER | 19 | ADAMS | 8 | ADAMS | 17 |
| JONES | 18 | ANDREW | 23 | CUMMINGS | 11 |
| | | BLAIR | 4 | ELLIOTT | 15 |
| | | HOWARD | 37 | HOWARD | 21 |
| | | HOWARD | 12 | | |

*FIG. 3*

| GLOBAL INDEX | |
|---|---|
| NAME | PID |
| ADAMS | 02 |
| ADAMS | 03 |
| ANDREW | 02 |
| BAKER | 01 |
| BLAIR | 02 |
| CUMMINGS | 03 |
| ELLIOTT | 03 |
| HOWARD | 02 |
| HOWARD | 03 |
| JONES | 01 |

*FIG. 4*

MULTI-TIERED INDEXING METHOD FOR PARTITIONED DATA

This is a continuation of application Ser. No. 08/001,491 filed on Jan. 7, 1993, now abandoned.

FIELD OF THE INVENTION

Broadly conceived, the present invention relates to indexing mechanisms in database management systems and, in particular, to a multi-tiered indexing method for partitioned data.

BACKGROUND OF THE INVENTION

With the amount of information often desired to be stored in a database system increasing, data or complete records are often stored in more than one database storage site. One important aspect of the database programs is the ability to provide fast and efficient access to records in each individual database. To properly handle the distribution and retrieval of the data, data processing systems often include database management programs. These programs provide easy access to database information that may each consist of a multiple of records stored at many nodes or sites. Relational database management programs provide this capability.

One common configuration of a database is one that is made up of various tables with each table containing rows and columns of information. The information stored across one row in the table would make up one record and the fields of the record would be the columns in the table. In other words, the table would contain rows of individual records and columns of record fields. Because one record may contain more than one field of information, the information of the field would make up the columns of the database table. Other database configurations are found in the art. Database management programs support multiple users thereby enabling each user to access the same table concurrently.

An index file is commonly used by database management programs to provide quick and efficient associative access to a table's records. These index files are commonly configured in a B-Tree structure which consists of a root node with many levels of nodes branching from the root node. The information contained in these nodes may include pointers which point to the nodes at the next level of the tree or it may include pointers which point to one or more records stored in the database. These pointers include additional key record information which may reference the records stored in the database. The record keys are stored in an ordered form throughout the nodes at the various branches of the tree. For example, an index tree may exist for an alphabetic listing of employee names. The root node would include reference key data that relates to individual record information that may be indirectly or directly referenced by the next level of nodes in the tree. The reference keys contain information about the index field, e.g., the alphabetic spelling of the employee's name. Therefore, the ordered keys in the root node would point to the next successive level of nodes. In other words, the next successive node may indirectly or directly reference all employees names beginning with A, B, and C. A next successive node, parallel with the first successive node, may contain employee records whose last name begins with the letters D–M. The last successive node on this level would reference records of employees with last names starting with N–Z. As one searches through the index tree, a bottom node is eventually reached. The contents of the bottom node may include record key information that further points to individual records in storage or may point back to one of the branch nodes in the tree.

For parallel databases or distributed database systems, the problem of accessing a table partitioned across multiple storage sites becomes more complicated. One or more partitions of a table may be stored in a single site. Each partition of the table typically is associated with a group of physical storage devices. Typically a partition is a horizontal portion of a table's records. The motivations for horizontally partitioning a database object may be to partition a very large table of information, such as all the employees' information for a large corporation, among multiple storage sites so as to facilitate parallel processing of a user's query or to allow each node to retain efficient access to its own locally stored records. Another motivation may be to partition a large database table across multiple storage sites so as to facilitate better administration of the physical storage volumes.

A database object may be partitioned either horizontally or vertically according to the content of its records and fields. A horizontal partition would mean that certain rows of the table would be stored at one storage site while other rows in the table are stored at other storage sites. A vertically partitioned table would have certain columns or fields stored at one storage site while other fields would be stored at other sites. Separate index trees might be built for each of the partitions. One tree may contain the names and addresses of employees A–J while another tree contains names and addresses of employees K–L and so on. In such a manner, very large volumes of record information can be stored across multiple storage sites with the table partitioning method depending on the type of information stored and the application.

A Relational Database Management System (RDBMS) may be used to manage the table information that has been distributed across multiple partitions or nodes. In the case where a database table is partitioned according to the content of its records, one or more fields of a particular table record can be designated as the Partition Key of that individual record. One case might be to designate the employee serial number as the partition key of that employee's record and store in each partition a set of records containing serial numbers within a certain range of values. A different partitioning criterion may group the records directly by their Partition Key Values, which might be some other piece of information contained in the record, such as the employee's work location, and may further determine a partition by hashing on the value of the work location field. On the other hand, a database table may also be partitioned using a non-content based criterion, such as some inter-table relationship that is not related to the information contained in the employee's record, but rather a insertion storage site or node.

One problem in the art has been to support associative searches efficiently. Indexes are often maintained on the search field or fields of the stored data in order to provide associative search efficiency.

An index typically consists of a separate table or list of entries having the form (INDEX KEY, RECORD POINTER). This index table is typically ordered by the value of the INDEX KEY which might be some particular piece of record information, and is typically configured in a B-Tree structure as described above. The value of the INDEX KEY may be the employee's serial number or some other record information. An ordering of the index table by the value of the INDEX KEY entry facilitates the search by narrowing the list of candidate records and thereby reducing the access time to the record or records for the user requesting it or them. The RECORD POINTER is the other index table entity which can be a piece of information of fixed-length such as a system-assigned token called a Record Identifier (RID). In some database configurations, the RECORD POINTER may be user-provided. In any case, the RECORD POINTER uniquely identifies a data record.

For partitioned data, an index called a Local Index may be maintained separately for each individual partition of the table. If no single index which references data in multiple partitions is maintained, then this is known as the Local Index Only solution to the associative access efficiency problem. The Local Index Only solution is a simple way to provide indexing capability for partitioned data. In this solution, the Local index may be a table or list similar to the index table previously discussed.

The simplicity of the Local Index Only solution comes with a severe performance penalty which is disabling in very large databases. Since only local indexes exist at each partition site, most access requests are broadcast to all the partitions for processing. Each node has to check its table to see if the desired record information exists at that node. The Local Index Only solution also requires that all partitions of a table be available in order to properly evaluate most access requests. Over a system with multiple nodes, precious processing resources may be consumed by useless activity.

Processing resource is not only consumed by the user. The access requests sent to each site are not always only those explicitly specified by the users. There may be low-level requests generated by the database management system in processing and evaluating the higher-level user requests. There may also be system requests to enforce certain database constraints which maintain referential integrity across the multiple storage sites. In addition, an access request may need to obtain certain information that pertains to the entire object such as checking the existence of a particular key value to enforce key uniqueness. Moreover, the query response time is lengthened because of the time spent waiting for all the local nodes to complete their respective operations before undertaking the next set of instructions. A longer query wherein a lot of information across multiple partitions is accessed may cause significant performance degradation. The performance impact may increase quickly with the number of partitions a table is made up of. As a result, the database workload is significantly increased and the system efficiency throughput is ultimately reduced making such a system appear sluggish to the user.

Because of the useless activity, the Local Index Only approach is not a scalable solution to associative searching. In other words, the Local Index Only solution does not continue to perform well as the number of partitions of the table begins to increase dramatically.

To provide more efficient indexing support for partitioned data, a Full Global Index, which is an index covering all the partitions of the indexed table, can be utilized. A Full Global Index contains at least one entry for each object of interest in the table thereby having a one-to-one relationship with every object of interest in the entire table. One approach to global indexing is called the Primary Key Approach, wherein a Global Index is maintained as a list of entries having the form (INDEX KEY, PRIMARY KEY), wherein the primary key is the partition key. In this case, each data record is uniquely identified across all partitions by a user-provided PRIMARY KEY value. The Partition Identifier (PID) of the targeted partition can be determined using the PRIMARY KEY value in conjunction with the partitioning criterion. Because the records must be stored in a way that allows them to be retrieved using the PRIMARY KEY only, this leads to a database design in which a clustering Local Index is maintained on the PRIMARY KEY, with the PRIMARY KEY being the value of the Clustering Key. One approach is to store the record itself in the tree of the index and possibly avoid an extra Input/Output operation for accessing the records.

An alternative to the Primary Key Approach is the Partition Key Approach, wherein a Global Index entry is in the form of an (INDEX KEY, PARTITION KEY). The PARTITION KEY is not the Primary Key, otherwise, it is the same as the Primary Key Approach discussed above. The PARTITION KEY must be unique else a selection predicate applied to the INDEX KEY must be re-applied to the retrieved records in order to assure correct data retrieval. This often leads to a database design in which a clustering Local Index is maintained on the PARTITION KEY with the PARTITION KEY value being the Clustering Key value. A Global Index improves the efficiency of the evaluation of the user's query by allowing an access request to be redirected only to the relevant partitions, and by providing globally available INDEX KEY information quickly. It has the drawback of increasing the index management cost, which is the cost to the database management system to assure consistency between index tables and the data records, especially in the configuration wherein each partition is stored at a separate database storage site.

Other papers that the applicant believes are pertinent to an understanding of the background of this invention include the following: Levine et al., "Method For Concurrent Record Access, Insertion, Deletion and Alteration Using An Index Tree", U.S. Pat. No. 4,914,569, (Apr. 3, 1990) wherein a method for fetching key record data in a group of record keys according to at least a portion of a key record through an index tree, which provides concurrent accesses of record keys by different transactions, is disclosed;

Mohan, "ARIES/KVL: A Key-Value Locking Method for Concurrency Control of Multiaction Transactions Operating on B-Tree Indexes", Proceedings of VLDB, August 1990, wherein index key value locking and the lock state replication via next key locking is discussed;

Mohan and Levine, "ARIES/IM: An Efficient and High Concurrent Index Management Method Using Write-Ahead Logging", Proceedings SIGMOD Conference, June 1992, wherein index entry locking and left side propagation of the uncommitted first instance is discussed:

Mobart, "COMMIT_LSN: A Novel and Simple Method for Reducing Locking and Latching in Transaction Processing Systems", Proceedings of VLDB, August 1990, wherein the COMMIT_LSN idea is discussed; and Mobart, Haderle, Wang, and Cheng, "Single Table Access Using Multiple Indexes: Optimization, Execution and Concurrency Control Techniques", Proceedings 2nd International Conference on Extending Database Technology, Italy, March 1990, wherein index ANDing/ORing and re-evaluation of predicates are discussed.

BRIEF SUMMARY OF THE INVENTION

The present invention relates to indexing mechanisms in database management systems and, in particular, to a multi-tiered indexing method for partitioned data in distributed or parallel database systems.

It is a primary object of the present invention to provide multi-tiered indexing for partitioned data having a Coarse Global Index and a Local Index for each partition wherein the Local Index entries are co-located with the corresponding partition at the same node in order to enhance the efficiency of complex query evaluation and index maintenance.

It is another primary object of the present invention to provide a method for index management that assures consistency between Local and Coarse Global Indexes such that concurrent index accesses by different transactions are maximized.

It is another primary object of the invention to provide an index management method having a locking protocol for both the unique and non-unique Local Index schemes that minimizes locking only to those cases involving an inserted or deleted key and to the key following and possibly the key preceding the inserted or deleted key, thereby allowing very high concurrency between simultaneous Readers, Inserters, and Deleters.

It is yet another object of the present invention to provide a Coarse Global Index that associates the individual Index Key values with their target partitions, so that an access request with a highly partition-selective search predicate on the Index Key can be quickly and easily directed to the target partition(s) for processing.

Briefly and to achieve the foregoing objects in accordance with the present invention as embodied and broadly described herein, a distributed database multi-tiered indexing scheme for partitioned data has a Local Index created and maintained for each partition of the table and, in addition, a Coarse Global Index is optionally created and maintained. The Coarse Global Index identifies the indexed partition(s) by partition identifiers (PIDs). An index maintenance algorithm assures the consistency between the Local Index entries and the Coarse Global Index entries during concurrent index accesses by different transactions by a locking protocol that handles the insertion and deletion of index entries simply and efficiently. An insert or delete operation that needs to be performed on the Coarse Global Index can be initiated only after all the locking required for performing the corresponding Local Index operation has been completed, in order to correctly determine whether in fact the Coarse Global Index update operation is required.

It is an advantage of the present invention to provide multi-tiered indexing for partitioned, data wherein the Local Indexes are maintained for the individual partitions such that each partition may be packaged as a separate data module that contains its own access methods, thus providing a removable/transportable database unit. In the case involving database network failures, the Local Indexes are still available. Therefore an object partition of the database also remains available for the evaluation of local queries thereby increasing the overall availability of local data.

It is another advantage to provide multi-tiered indexing for partitioned data on database systems having data-intensive retrieval by keeping all the index entries for a record at the same node as the record, thereby reducing inter-processor communication while allowing asynchronous prefetching of data pages and parallel Local Index operations, and by placing more reliance on the local nodes to perform the processing to maximize parallelism and accommodate and facilitate node heterogeneity and autonomy.

It is yet another advantage of the present invention to provide the database designer with the option of using only Local Indexes without the Coarse Global Index if a particular Index Key is not partition-selective, thus eliminating the need to maintain global information on that particular key, and thereby increasing flexibility in the design of the database and providing more opportunity for database optimization.

It is another advantage to provide multi-tiered indexing for partitioned data, wherein each request within each partition is quickly evaluated as if the data was unpartitioned, in order to be transportable to database systems having a plurality of access methods.

It is an additional advantage to provide multi-tiered indexing for partitioned data which is compatible with a variety of data partitioning schemes, which readily accommodates a variety of non-key-inversion local access methods such as hashing, R-tree, and signatures, thereby freeing the optimizer to choose among available access methods to process a query without additional burdensome constraints, and which is easily extended to include both Global Index Only access to check key uniqueness, and Global Index AND/OR logical operations to merge PIDs obtained from multiple Global Indexes. For co-located objects, the Local Indexes remain available to facilitate join operations.

It is still yet another advantage to use a Coarse Global Index to route an access request directly to the targeted partition(s) in order to reduce the probability of creating a hot spot at the Global Index site(s), thereby increasing overall capacity, which is more efficient to access in the case of a non-unique index, and which further minimizes the amount of information stored at the Global Index site(s).

It is yet another advantage to enhance data access efficiency by providing an efficient and dynamic indexing solution that scales with the degree of partitioning, and which ultimately significantly improves the scalability of the partitioned database.

Additional objects and advantages of the invention will be set forth in the description which follows, and in part will be obvious to those of ordinary skill in this art from the following detailed specification or may be learned by the practice of this invention. These and other objects and advantages may be realized and obtained by means particularly pointed out in the appended claims taken in conjunction with the accompanying drawings and detailed specification.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof, which is illustrated in the appended drawings. Understanding that these drawings depict only a typical embodiment of the invention and are not therefore to be considered limiting of its scope, the invention will be described and explained with additional specificity and detail through the use of the accompanying drawings in which:

FIG. 3 is a diagram of Local Index tables of the present invention for the database table depicted in FIG. 2, wherein, for each table, the name entries and the associated record identifiers or RIDs are illustrated; and FIG. 4 is a diagram of the Coarse Global Index table of the present invention for the database table depicted in FIG. 2, illustrating the name entries and the associated partition identifier or PIDs.

DETAILED DESCRIPTION OF THE PREFERRED EMBODIMENT

Figures 1, 2:
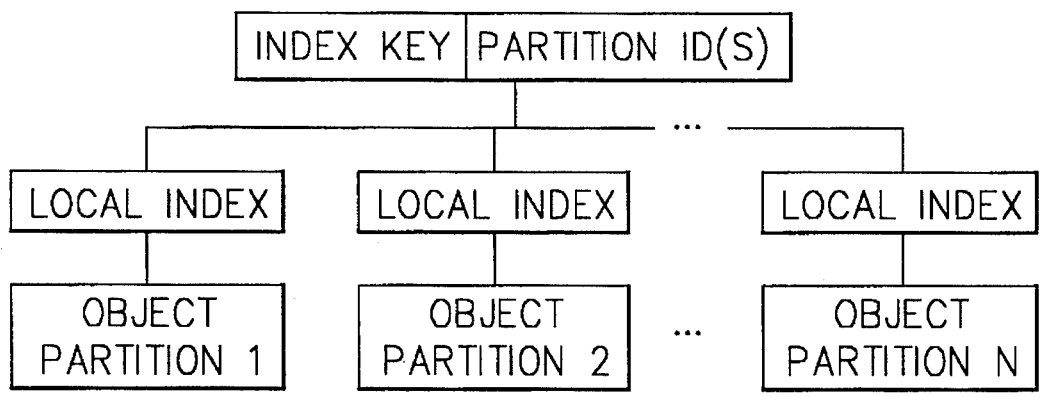
FIG. 1 is a diagram illustrating the two-tiered indexing hierarchy of the present invention, wherein a Coarse Global Index is maintained which indexes the partitions but not the records, with the Partition ID(s) referencing one or more Local Indexes, which in turn reference the records in an Object Partition.
FIG. 2 is a diagram of a table within a database containing the information relating to employees, employee numbers, and their respective work locations.

The present invention is directed to a multi-tiered indexing method for partitioned data.

A database object, such as a table managed by a Relational Database Management System or RDBMS, may be horizontally-partitioned such that each record of the object is stored in one of the many partitions of the object. Each partition of the object is typically associated with a group of physical storage that is disjoint from those of the other partitions and may or may not be managed by a separate processor. A partition has a unique Partition Identifier or PID. The motivations for horizontally partitioning a database object are to partition data among multiple nodes or processors within a single DBMS system so as to facilitate parallel processing of a DBMS query, to support a distributed object among multiple nodes or sites in a DBMS network so as to allow each node to retain access efficiency for the local records, and to partition a large database object over multiple storage groups so as to facilitate the administration of the physical storage volumes. It should be understood that the above paradigm, wherein each partition of a database object is managed by a separate local DBMS node, is what is assumed for the preferred embodiment of the present invention. However, the invention is equally applicable to other forms of partitioned data.

To support associative search efficiency, indexes are often maintained on one or more search fields. An index is an inversion on the search field. Logically, it is a list of entries. The Global Index Table of the present invention is preferably coarse, in that it contains only a list of entries wherein each entry, is an Index Key Value and a set of PIDs. The list of PIDs associated with an Index Key Value advantageously does not contain duplicates, so that there is only a single entry in the Global index Table for a given partition in which a particular key value exists, even if the corresponding Local Index Table contains multiple instances of an Index Key. When a Unique Global Index is defined, the Global Index Entry may contain record identifiers (RIDs) in addition to partition IDs for efficiency reasons.

The additional index maintenance cost for including the RIDs is small, although the availability of the RIDs saves Local Index access and therefore improves the performance of transaction processing, which typically accesses a few records using a Unique Key. The optional RIDs that may be stored in a Unique Global Index are less attractive to a distributed database, because of their impact on node autonomy, and because of the usually higher communication cost. Some database applications may prefer not to store the RIDs in a Unique Global Index Table, or not to use the RIDs when they are available, and instead access the Local Index Table. Additionally, storing RIDs in a Global Index Table reduces node autonomy for a distributed database unless a Primary Key is used, and the cost of sending the RIDs and then re-certifying the retrieved records may be substantial for a data-intensive query. When a partition is recognized, it is advantageous that only Unique Global Indexes that contain RIDs have to be updated, while all other Global Indexes are not affected.

Within each partition, the request is evaluated in the usual way, as if the data were unpartitioned. This includes the exploitation of all available access methods such as physical clustering of the records; the use of asynchronous I/Os; and large buffers. The data-access interface between the DBMS nodes is compact and closer to a traditional DBMS APL. Thus, access requests remain at a high level.

In order to allow a user to specify whether a Global Index is to be created or dropped for an index, the SQL DDL interface of the DBMS may be extended, for example, to include a special keyword in the CREATE INDEX, DROP INDEX, and ALTER INDEX statements. Alternatively, explicit CREATE and DROP statements may be defined for a Global Index directly. On the other hand, the DBMS may also decide on its own, based on the anticipated need of the system, to create a Global Index in addition to the Local Indexes to enhance system performance. This may be done as part of the DDL processing or done by the optimizer at query-compilation time. If all the access requests that use an index are not Global-Index-Only and not partition-selective, the Global Index is not effective. In this case, a Local-Index-Only solution is entirely adequate for this index, thereby completely eliminating the maintenance cost and the storage for a Global Index. It should be appreciated that if a particular Index Key is not partition-selective, and if there is no need to maintain global information on that key, then the database designer has the option to create only the Local Indexes without the Coarse Global Index. It should be understood that the indexing scheme of the present invention is applicable for both cases.

The intended uses of the Coarse Global Index of the present invention are to associate the individual Index Key Values with their target partitions, so that an access request with a highly partition-selective search predicate on the Index Key can be directed to the target partition(s) for processing. It is also used to maintain global information on the Index Key, so that the global information can be retrieved by an index-only access, in order, for example, to check the existence of a Key Value or to count the number of distinct Key Values.

The preferred embodiment of the indexing method of the present invention is the two-tiered indexing method for a partitioned database of objects. The preferred method involves creating a Local Index Table for each partition of the database and creating a Coarse Global Index Table containing one unique Global Index Entry for each distinct Local index Key Value in each Local Index Table. The Local Index Table contains one Local Index Entry for each object of interest in the corresponding partition of the table. Each Local Index Entry consists of an Object Identifier, such as a record pointer, identifying an object of interest in the corresponding partition and a Local Index Key Value which relates to the identified object of interest.

As is shown in FIG. 1, a Local Index is maintained for each partition of the object. Either a RID or a Primary Key may be used as a record pointer. A Coarse Global Index is maintained which indexes the partitions but not the records with the Partition ID(s) referencing one or more Local Indexes which in turn reference the indexed records in an Object Partition.

To create an index on an existing object, the object has to be scanned to capture the Index Key Values and the corresponding Record Pointers. The Index Key Values and Record Pointers are sorted at each partition to create a Local Index. Assuming the Global Index Table is used, a sorted list of distinct Key Values are sent to the Global Index node. A Coarse Global Index Table is created by merging the sorted Key Value lists and adding the PID associated with each list. If multiple records in a partition have the same Index Key Value there will be only one entry in the Coarse Global Index. Therefore, only when the first instance of a Key Value is inserted into a Local Index Table should an entry be inserted into the Global Index Table. Similarly, only when the last instance of a Key Value is deleted from a Local Index Table can an entry be deleted from the Global Index Table. This reduces the index maintenance cost.

For a Unique Index, the Global Index Table may also contain the Identifiers of the indexed records to allow skipping Local Index Table access. If the Coarse Global Index contains Record Pointers, then an access request may be appended with a tentative RID=or Primary_Key=selection predicate before it is sent to the target partitions. The appended predicate may be used as a fast path to fetch the target records. For a transaction such as a non-repeatable-read operation in which the scanned Global Index Table entries are not locked, the selection predicates that were applied to the Global Indexes must be rechecked later, i.e., when the records retrieved from the fast path must be re-certified using the original search predicates. Like other database objects, the Coarse Global Index Table can itself be partitioned if necessary.

If a simple access request contains only a search key to reduce the search scope to a subset of the partitions using an applicable Global Index, then the Global Index Table is searched much the same as a regular index in order to obtain a list of target PIDs. After duplicate PIDs are removed, the same access request is then sent to the target partitions identified by these PIDs for local evaluation. If there is no applicable Global Index, then the request is broadcast to all the partitions for evaluation.

By way of example in order to illustrate the Global and Local Index Tables of the present invention, reference is now made to FIG. 2, which is a diagram of a table within a database, the table containing information relating to employees, employee numbers, and their respective work locations. This information represents what would be contained in a database of employee records. The first column of FIG. 2 is labeled RID, and represents the Record Identifiers for each of the associated employee records. For instance, employee Adams has RID=8 which means that this particular employee's record is identifiable on this partition by 8. Note that PID=02 is the database partition corresponding to the San Jose worksite where this record is stored. The associated employee number for this Adams entry is 1.

With respect to FIG. 2, it is important to note that there are two Adams entries. One Adams entry is located on the 02 database partition, and the second Adams entry is on the 03 partition, because this database has been partitioned according to the employee's worksite. Also, there are three Howard entries, two of which are associated with the San Jose partition, and the other is associated with the Watson partition.

Reference is now made to FIG. 3, which is a diagram of Local Index Tables of the present invention wherein, for each table, the name entries and the associated RIDs are illustrated. In accordance with the preferred embodiment of the present method as discussed above, a Local Index is created for each partition containing the employee name and the RID for each employee entry in the database. In the present example, there are three Local Index Tables that are created. One Local Index is for the database partition associated with the Almaden worksite and contains only the entries for those particular employees who work in Almaden. Thus, the Local Index Table for the Almaden partition contains the Baker and Jones entries along with their respective Record Identifiers, which in this case is 19 and 18, respectively. The Local Index for the San Jose partition contains those entries that correspond to that particular worksite. As such, this Local Index Table has Adams at RID=8, Andrew at 23, Blair at 4, Howard at 37, and another Howard at RID=12. Note that in accordance with the preferred embodiment, the Local Index Table has one entry for each record in its corresponding partition, including duplicate key values as illustrated.

With respect to the Watson partition, the Local index Table entries are Adams at RID=17, Cummings at 11, Elliott at 15, and another Howard at 21. Note that there are three distinct Howard employees. Two of the Howard employees are assigned to the San Jose worksite and thus appear in the San Jose partition, and another Howard employee is assigned to the Watson worksite and therefore appears in the Local Index Table having that partition's corresponding employee entries. Likewise, there are two distinct Adams employees, one of which is assigned to the San Jose worksite and the other is assigned to the Watson worksite. As such, each employee name appears in the Local Index Table created for the corresponding partitions.

The creation of the Coarse Global Index, as discussed in the preferred embodiment, is shown in FIG. 4, which is a diagram of the Global Index Table illustrating the name entries and the associated PIDs. In this example, the Global Index contains the Key Values and the PIDs. The Key Values, in this instance, are the employee's names. The Global Index Table of FIG. 4 has the first entry of Baker and PID=01, which corresponds to the Local Index for partition 01, i.e., the Almaden worksite. The Jones entry for the Local Index for partition 01 is also listed, because the Global Index contains only 1 entry (Key Value, PID) for each unique Local Index entry. With respect to the Local Index associated with the partition designated to the worksite San Jose (or partition 02), the Global Index also contains the entries Adams 02, Andrew 02, Blair 02, and a single entry for Howard 02. The single entry for Howard is because the present method for indexing only allows the Global Index to have a single entry for any duplicate key values that appears in any one Local Index Table. Thus, since the Local Index Table for partition 02 has two identical Key Values associated with Howard, i.e., Howard RID=37 and Howard RID=12, the Global Index will contain only one reference to the Key Value "Howard" with a single partition identifier of 02.

Continuing, the Global Index Table has an entry for Adams at 03, Cummings at 03, Elliot at 03, and Howard at 03. Note that the Global Index has two identical Key Values, namely those entries having Key Values of Adams and Howard. However, because each of these entries is associated with a different partition, and thus will appear in a different Local Index Table, the Global Index will have duplicates for these entries but not duplicates associated with any one Local Index.

As can be seen by the construction of the two-tiered indexing scheme shown in FIGS. 1–4, a Coarse Global Index tends to distribute the work to the local nodes. For an update transaction, a Coarse Global Index is much less sensitive to record changes. For data-intensive retrieval which is typical in Query Processing, the present invention keeps all the Local Index entries at the same node as the indexed records, and therefore reduces the communication cost, and allows asynchronous prefetching of data pages and parallel Local Index operations. The cost of physical construction of the Local and Global Indexes, which includes composing and writing the index pages, is proportional to the total size of the index, giving the two-tiered method of the present invention the advantage of parallel construction of the Local Indexes.

The Coarse Global Index is mainly used to route an access request to the target partitions for processing instead of merely enumerating the query result. A Coarse Global Index may also be used to obtain global information on the Index Key (e.g., to prove the existence of a given Key Value, to assure key uniqueness, or to support a referential constraint or key cardinality). Consequently, as the number of partitions increases along with the size of the indexed object, the workload per partition and the overall elapsed time remain relatively stable. Thus, the Coarse Global Index enhances data access efficiency and reduces resource consumption. In addition, the partitioning flexibility contributes to the ability to handle growth effectively. Thus, the Coarse Global Index method significantly improves the scalability of the partitioned database.

The following considerations facilitate the implementation of the indexing method of the present invention to retrieve selected records from an object (table).

If there is a selection predicate on the Partition Key that can be evaluated into PIDs, then evaluate that predicate. If there is an applicable and selective Coarse Global Index available, then obtain the qualified PIDs from that Coarse Global Index. Sort the PIDs, remove the duplicates, and merge with the PIDs based on Partition Key, if they exist. Obtain record Identifiers for a Unique Index. Additional Coarse Global Indexes may also be used by ANDing/ORing the PIDs obtained from them. If the PID list becomes too long, i.e., it is no longer selective, the DBMS may stop using the Global Index and release S-Locks if any are held, and proceed to broadcast the query instead. If the query is not partition selective, then let the PIDs be logically the list of all partitions. Send the query to each identified partition for evaluation. Utilize any available local access methods such as Local Indexes and others. The choice of which Local Indexes to use may be different from the Global Indexes used. Apply any suitable local evaluation techniques, e.g., Index ANDing/ORing, list sorting, or asynchronous I/O. Each node may use a different query evaluation plan depending on its database statistics, record clustering scheme, and available access methods. For a non-repeatable-read transaction in which the scanned Global Index entries are not locked, a record that is retrieved using a record identifier obtained from a Unique Global Index should be re-certified. Finally, merge the results if the query was evaluated at multiple nodes.

For the two-tiered method of the preferred embodiment, the Global Index of a Non-Unique Index is not always used or even maintained depending on the implementation. The Local Index is the real index that identifies the indexed data records. For data retrieval, a Non-Unique Global Index is used primarily for target-partition selection. The local results obtained from these target partitions are then merged to form the actual result. The internal pointers (RIDs) are not exposed which reduces the risk of an integrity exposure or security breach. If a Global Index is not likely to improve significantly the partition selectivity for a query over broadcasting or through Global Index ANDing it is not used. In other words, a Global Index is only used to save local processing. On the other hand, if a Global Index is used, then its corresponding Local Indexes are not necessarily used. For instance, the Global Index may be used for an index-only access, or the Local Index is not used because it is not clustered, or because it has a low record-selectivity for the query.

With respect to record selectivity, it should be noted that if the average number of index entries for a Key Value in a Local Index is n, the probability that a Local Index update operation is either inserting a new Key Value or deleting the last instance of a Key Value, thereby causing a Global Index insertion or deletion, is usually much smaller than $1/n$. For example, consider an index on the DEPARTMENT field of an EMPLOYEE table. The index is updated whenever a person joins the company, changes his/her department, or leaves the company. However, except for the first person joining a new department and for the last person leaving a department (e.g., when a department is dissolved), all other personnel changes at a worksite do not cause a Global Index update regardless of the average size of a department.

Furthermore, a local query processor may dynamically decide whether a Local Index is to be used based on the key statistics obtained from the Coarse Global Index, e.g., the number of qualified Key Values for the partition. It should be understood and appreciated that such run-time local optimization is very useful to handle data skew.

The present two-tiered method is advantageously compatible with many existing DBMSs that currently do not support partitioned data or a DBMS having only an interim Local-Index-Only solution used to index partitioned data, because the present method continues to use the Local Indexes as the primary access methods, and the Global Indexes are considered optional. Existing DBMS logic and most of the relevant code is reusable or easily modified to incorporate the present two-tiered indexing method. Existing unpartitioned databases will be supported by the same logic without the risk of performance degradation. Therefore, the DBMS development cost is lower.

An existing optimizer may first be extended to utilize the Global Indexes in simple ways, e.g., to check key uniqueness and to select the target partitions using a favorable selection predicate. Because more exploitation of the Global Indexes may be added over time, for example, to join tables, the implementation may also be done in phases.

Since Local Indexes are maintained for the individual partitions, each partition may be packaged as a separate data module that contains its own access methods. Such a self-contained data module may be used as a transportable database unit, for instance, on a massively distributed database system. After a data module is mounted, scanning its Local Indexes in order to update the Global Indexes is fast and easy. When a data record is inserted, deleted, or updated one or more indexes may have to be updated as well. Updating a Global Index is more costly than updating a Local Index if it crosses processor space. The Global Index is optional. It is updated only when a new Key Value is inserted into a Local Index or when the last instance of a key value is deleted from a Local Index. Therefore, the Coarse Global Index update cost for a Non-Unique Index is advantageously low.

For a Unique Index, the present method has to maintain the Local Indexes in addition to the Global Index. Although the Local Indexes are redundant and can be eliminated to save their maintenance cost and storage space, the savings, in some instances, might not be worth the impact created by the resulting non-uniformity between a Unique Index and a Non-Unique Index, e.g., index management logic, query processing logic, utilities, availability, and node autonomy. On the other hand, the Local Indexes may be used for query evaluation when a search request on the unique key is not partition-selective and therefore the Global Index is not used. Furthermore, a Local Index may be used to evaluate local queries, and may be used to check the local existence of a key value when a key is inserted so as to minimize Global Index Accesses.

Node heterogeneity and node autonomy are important to a distributed database. Heterogeneity includes local access methods, the form of Record Pointer, clustering methods, hardware and environmental differences, and the optimization algorithm implemented. The present method keeps the least amount of information of each partition in the Global Index and relies on the local nodes to perform most of the processing. It is therefore best able to accommodate node heterogeneity and autonomy. Existing applications that access an unpartitioned local object could continue to function even if the object becomes a partition of a distributed object.

If the DBMS network fails, an object partition of a distributed database, wherein the two-tiered method of the present invention is implemented, is still available for the evaluation of local queries because the Local Indexes are still readily available which increases the accessibility of the local data. A query evaluation plan that uses the Partition Key to reduce the search scope as well as indexes to find records may require fewer nodes to be available because the indexes are local to the target data. Similarly, the availability of the database is also higher for update operations because Global Indexes are not accessed unless a new Key Value is inserted into a Local Index or the last instance of a key value is deleted from a Local Index Table.

The indexing method of the present invention further allows a full exploitation of data clustering alternatives to match the access patterns which optimizes the physical database design. By one example, inter-table clustering may be used to support relationships and complex objects more efficiently. Since every record and its Local Index entries are always co-located at the same node, the efficiency of complex-query evaluation and Index maintenance is enhanced.

The present invention offers additional opportunities for optimization. A more efficient access plan may be possible because of more access path choices. Other types of access methods besides key inversion (index) may be implemented such as: signature; R-tree; and hashing. Global Indexes may be used for a partition-selective query to reduce the overall workload whereas broadcasting may be used for a less partition-selective query in order to avoid the cost of Global Index accesses. The optimal choice of the Global Indexes to use may be different from the optimal choice of the Local Indexes used because the available indexes as well as the access objectives at the global level may be different from those at the local level.

The local access plans may be different from one another because of data skew, workload, or node heterogeneity whereas the methods of the prior art offer few alternatives if indexes are to be used. For instance, a long list of Record Pointers obtained from each Global Index has to be sorted according to the partitioning criterion. The sorted sublists are then distributed to the target partitions. The Partition Key Approach and the Primary Key Approach may have to handle longer and variable-length pointers and, depending on the partitioning scheme implemented, they may have to apply the partitioning criterion to every pointer individually, whereas the two-tiered method of the present invention has a shorter Pointer (PID) list because the Global Index is coarse and therefore duplicate PIDs can be removed progressively using a known sort, e.g., a tournament sort.

Further, it is easier to handle because a single PID is shorter and of fixed length. Since the Global Index is coarse and uses shorter PIDs, it may have one fewer B-tree level than a Full Global Index would have and therefore one fewer I/O may be needed to access the index. Similarly, a Local Index also has fewer entries and uses shorter record pointers so it may also take fewer I/Os to access.

Although the preferred embodiment is discussed in a two-tiered indexing context, it should be understood and appreciated that the two-tiered indexing scheme of the preferred embodiment can be generalized to a multi-level scheme. Therefore, the multi-level indexing scheme is herein contemplated by and within the scope of the present invention.

For example, an object in a distributed database may be horizontally partitioned among several DBMS sites, and each of theses partitions may be further partitioned at the local site for parallel query processing. The distributed database may itself be organized topologically as a hierarchy of networks, institutions, local-area networks, or other configurations. In order to create an index on this object, a Local Index is created for each leaf-node partition of the object. For every non-leaf node in this hierarchy, a Coarse Global Index may be created. In general, a Global Index at one level may be a Local Index for the next higher level in the hierarchy. In order to maintain the index hierarchy, an index in the hierarchy only needs to know the target items it indexes, such as data records or Local Indexes, and its Global Index if one exists. With that information, the two-tier index maintenance algorithm can be applied, and the multi-tiered hierarchy will be maintained correctly. The overall maintenance cost depends on the number of Global Indexes to be updated when a base Local Index is updated. The coarseness of each Global Index progressively reduces the impact of a record update to a higher-level Global Index.

It should be appreciated that multi-level indexing does not necessarily require multi-level partitioning of an object. Operationally, a Coarse Global Index can be created on any set of indexes that have compatible Index Keys, so long as every index has only one parent Global Index. The Identifier of an index, or a logical equivalent thereof, may be used as the target PIDs in a Global Index. However, creating and maintaining a Global Index is worthwhile only if it defines a search-scope that is useful for the evaluation of certain probable queries. This implies that the search scope must be meaningful to the user, describable through the DBMS interface, and recognizable by the optimizer. Therefore, it is the logical grouping that is important to a Global Index (although it is usually the physical partitioning that initially created the partitioned data and the leaf-level Local Indexes). Consequently, it is contemplated herein that the present multi-level index hierarchy scheme, which defines multiple levels of search scope, is to find such uses as described above, even if there is only one level of data partitioning, and the specific scope of each leaf-level Local Index is of no interest to any user.

For data retrieval using a high-level Global Index in the hierarchy, many indexes (one per subordinate level) have to be searched. In order to improve the performance, one can either limit the hierarchy, or flatten it by allowing an index to have multiple parent Global Indexes. The latter requires a small addition to the logic of the Local Index maintenance algorithm as follows: When it sends an INSERT or DELETE transaction request to its Global Index, it should also send it to all its Global Indexes.

For example, to index a PERSONNEL table which is partitioned by LABORATORY, a Local Index is first created for each LABORATORY. A Coarse Global Index may then be created for each DIVISION which consists of several LABORATORIES. Finally, a Coarse Global Index may be created on the DIVISION indexes for the entire CORPORATION. The top-level Global Index is useful for CORPORATION-wide searches and the second-level Global Indexes are useful for DIVISION-specific searches.

The CORPORATION index may be created on the LABORATORY indexes directly. Besides flattening the hierarchy, this multi-tiered approach introduces the ability to support non-hierarchical grouping or partially overlapped search scopes, i.e., REGIONAL Global Indexes may be created on the LABORATORY indexes to group LABORATORIES by geographic region. It should be appreciated that such a grouping would be orthogonal to the DIVISION grouping.

The method of the present invention advantageously includes methods to handle the insertion and deletion of unique and non-unique Index Entries. The following pseudocode will facilitate the understanding and implementation of the preferred embodiment disclosed and claimed herein.

UNIQUE INDEX KEY INSERT:

IF the Key Value being inserted
      is already present in the Local Index Table THEN
        Confirm that the already existing key is committed or that
        it is this transaction's uncommitted insert by locking it
        in S-Mode.
      IF the lock is acquired THEN
        return with a unique-key violation error-code.
      ELSE insert the key in the local index
        IF that key value is not already present in the Global Index
          then insert the key in the Global Index
        ELSE remove the key inserted in the local index and return
          unique key violation error-code.
NON-UNIQUE INDEX KEY INSERT:

Insert the key in the local index
    IF the key being inserted has a value that is not already
      present in any of the keys currently in the Local Index
        Table THEN Insert a key with that Key Value for this
        partition into the Global Index Table.
UNIQUE INDEX KEY DELETE:

Delete the key from the local index
    Delete the key with that Key Value for this partition from
      the Global Index.
NON-UNIQUE INDEX KEY DELETE:

Delete the key from the local index
    IF the key being deleted has a value that is not present in any
      other key that is currently in the Local Index THEN
        Delete the key with that Key Value for this
        partition from the Global Index.

The preferred embodiment for insertion in the Unique Index case involves first determining if the Local Index Key Value in the Index Entry to be inserted is already present in the Local Index Table and rejecting the insertion if it is already present. Otherwise, inserting the Index Entry into the Local Index Table, determining if the Global Index Key Value, which relates to the Local Index Key Value, is already present in the Global Index Table and if it is already present then deleting the inserted Local Index Entry from the Local Index Table and rejecting the insertion. If the Global Index Key Value which relates to the Local Index Key Value is not present in the Global Index Table then inserting into the Global Index Table a Global Index Entry consisting of a Global Index Key Value relating to the Local Index Key Value and a Local Index Identifier identifying the Local Index Table.

The insertion in the Non-Unique Index case involves inserting the Index Entry into the Local Index Table. Then, if that key value was not already present in the local index, inserting into the Global Index Table a Global Index Entry consisting of a Global Index Key Value relating to the Local Index Key Value and a Local Index Identifier identifying the Local Index Table.

The method or deletion of a Unique Index Entry involves deleting the key from Local Index Table and deleting from the Global Index Table the Global Index Entry relating to the Local Index Key Value and the Local Index Identifier.

The method of deletion of a Non-Unique Index Entry consists of the steps of deleting the key from the Local Index and determining if the Local Index Key Value in the Index Entry to be deleted is no longer present in the Local Index Table and if it is no longer present then deleting from the Global Index Table a Global Index Entry consisting of a Global Index Key Value relating to the Local Index Key Value and a Local Index Identifier identifying the Local Index Table.

Now that the insert and delete operations of the present method have been discussed, it is necessary to maintain consistency between the Global and Local Indexes. To assure the consistency between the Global and Local Indexes, a locking protocol must be specified to handle the insertion and deletion of index entries properly. This entails maintaining two conditions: if the Global Index indicates that a particular Key Value exists in a particular partition then the Local Index for that partition should contain that Key Value; and if the Global Index indicates that a particular Key Value is not present in a particular partition then the Local Index of that partition should not contain that Key Value.

While making the above checks for whether a particular insert key action is giving the insert of the very first instance of a Key Value or a particular delete key action is carrying out the delete of the currently present only instance of a Key Value, one must be sure that there is no uncommitted insert or delete actions by other transactions which could subsequently falsify the above inferences. It is in making these determinations that the method of the present invention uses locking in novel ways.

Generally, locks and latches are used for synchronizing concurrent activities. Latches are used to guarantee physical consistency of data while locks are used to assure logical consistency of data. Typically, latches are owned by processes and are usually held for a much shorter period of time than are locks. Locks are owned by transactions. The deadlock detector is not informed about latch waits. Latches are requested in such a manner so as to avoid deadlocks involving latches alone or involving latches and locks. Acquiring a latch is much cheaper than acquiring a lock because the latch control information is always in virtual memory a fixed place and direct addressability to the latch information is possible given the latch name. On the other hand, storage for locks is dynamically managed and hence more instructions need to be executed to acquire and release locks.

Locking is performed during Global Index operations in order to allow Index-Only access to the Global Index, e.g., for performing key-existence checks or for performing COUNT DISTINCT queries. For a Unique Global Index, in order to maintain the consistency between the Global and Local Indexes, if a key insert action attempted on the Global index is rejected due to a unique-key violation then the Local Index insert, i.e., the one that triggered the Global Index insert action attempt in the first place, will be undone before control is returned to the caller of the Local Index insert.

Lock requests may be made with the conditional or unconditional option. A conditional request means that the requestor is not willing to wait if the lock is not grantable immediately at the time the request is processed. An unconditional request means that the requestor is willing to wait until the lock becomes grantable. Locks may be held for different durations. An unconditional request for an instant duration lock means that the lock is not to be actually granted, but the lock manager has to delay returning the lock call with the success status until the lock becomes grantable. Manual duration locks are released some time after they are acquired and typically long before transaction termination. Commit duration locks are released only at the time of termination of the transaction, i.e., after commit or abort is completed. When a lock request for a resource returns successfully, the lock manager will indicate whether the current transaction was already holding and not yet released a lock on that resource before the current request was issued. In this case, the mode of the previously acquired lock will be returned.

Normally latches and locks are used to control access to shared information. Locks may be obtained in different modes such as S-mode (Shared), X-mode (eXclusive), IX-mode (Intention exclusive), IS-mode (Intention Shared), and SIX-mode (Shared Intention exclusive). The S and X-locks are the most common ones. The S-lock provides the read privilege and the X-lock provides the read and write privileges. Locks on a given object can be held simultaneously by different transactions only if those lock modes are compatible. The compatibility relationships amongst the different modes of locking are shown in the following table. The check mark indicates that the corresponding modes are compatible.

|     | S | X | IS | IX | SIX |
|-----|---|---|----|----|-----|
| S   | ✓ |   | ✓  |    |     |
| X   |   |   |    |    |     |
| IS  | ✓ |   | ✓  | ✓  | ✓   |
| IX  |   |   | ✓  | ✓  |     |
| SIX |   |   | ✓  |    |     |

With hierarchical locking, the intention locks (IX, IS, and SIX) are generally obtained on the higher levels of the hierarchy (e.g., on the table). The non-intention mode locks (S or X), when obtained on an object at a certain level of the hierarchy, implicitly grant locks of the corresponding mode on the lower level objects of that higher level object. The intention mode locks, on the other hand, only give the privilege of requesting the corresponding intention or non-intention mode locks on the lower level objects, e.g., an SIX-lock on a table implicitly grants an S-lock on all the records of that table and it allows an X-lock to be requested explicitly on the records of that table.

For the index insert and delete actions in addition to a lock being acquired on the current to-be-inserted or to-be-deleted index entry, a lock will also be acquired on the next entry. For the Non-Unique Local Indexes alone, sometimes a lock may also be acquired on the previous entry. The order in which these locks are acquired is: next entry, previous entry (if necessary), and the current entry. The lock modes of the present invention permit very high concurrency between Readers, Inserters, and Deleters.

Whenever INSTANT LOCKS are acquired, the latch on the page which holds the corresponding entry must be held until the insert or delete key action is completed on that page. Such a page latch must be released in order to avoid a deadlock involving latches if a lock requested while holding the latch is not immediately grantable. If the lock is obtained while not holding the page latch, then the latch must be reacquired and the whole process repeated. It should also be understood and appreciated that an insert or delete key action that needs to be performed on the Global Index can be initiated only after all the locking required for performing the corresponding Local Index operation has been completed. Only after the latter step is finished can it be correctly determined whether a Global Index operation is needed or not.

Briefly, many DBMS's known in the art track the page state with respect to the log records which are written as a result of an update made by a transaction. Each page has a field associated with it where the updating transaction saves the log-sequence-number (LSN) of the log record which it wrote for the latest update on the page. This field is called a Page_LSN. Before a transaction makes its first update, it writes a Begin-Unit-of-Recovery (Begin_UR) log record. The LSN of the Begin_UR log record for a transaction is always less than the LSN of any log record written for an update of a database by that transaction. It is assumed that the LSNs are ever increasing. The minimum LSN value of the Begin_URs of all active transactions in a DBMS is called Commit_LSN, which is a sequence number prior to which there is no uncommitted transaction.

The locking of the next, previous, and current entry during a key insert in a Local Index can be effectuated by implementation and understanding of the following:

NEXT ENTRY LOCK:

Lock next entry in IX-Mode for INSTANT duration.
PREVIOUS ENTRY LOCK:

IF (Non-Unique Index) AND
        (next entry's Key Value NOT EQUAL to-be-inserted entry's Key Value) AND
        (Previous entry's Key Value EQUAL to-be-inserted entry's Key Value) AND
        (LSN of page containing previous entry >= COMMIT_LSN) THEN
    Lock previous entry in IS-Mode for INSTANT duration
CURRENT ENTRY LOCK:

IF (this is a Non-Unique Local Index ) AND
        ((first instance of Key Value is being inserted) OR
        (previous entry had to be locked now and it was found
        to be already locked in X-Mode by current transaction) OR
        (next entry already locked in X-Mode by current transaction)) THEN
    lock entry to be inserted in X-Mode for COMMIT duration
    ELSE

```
    IF (next entry already locked in SIX-Mode or S-Mode by
         current transaction) THEN
       lock entry to be inserted in SIX-Mode for COMMIT duration
    ELSE
       lock entry to be inserted in IX-Mode for COMMIT duration
The locking done during a key delete in a Local Index is as follows:
NEXT ENTRY LOCK:

Lock in SIX-Mode for COMMIT duration
PREVIOUS ENTRY LOCK:

IF (Non-Unique Index) AND
    (next entry's Key Value NOT EQUAL to-be-deleted entry's Key Value) AND
    (previous entry's Key Value EQUAL to-be-deleted entry's Key Value) AND
    ((LSN of page containing previous entry) >= COMMIT_LSN) THEN
       lock previous entry in S-Mode for INSTANT duration
CURRENT ENTRY LOCK:

Lock entry to be deleted in X-Mode for INSTANT duration.
```

The index entry locking done during a key insert or delete in a Global Index (Unique or Non-unique) is the same as that for a Unique Local Index.

It is important that the next entry's lock is always obtained. If there is no next entry then a special end-of-index lock that is specific to this Local Index is used for this purpose.

The reasons behind the locking of the next entry during an insert are discussed herein. One reason is to check whether currently there is any Repeatable-Read (RR) transaction that has already scanned this index and that may not want the new entry to be inserted until the Reader terminates. If there had been a Reader it would have locked the next entry in S mode. The S-Locks left behind by the RR transactions are like notes left behind with respect to those entries with Key Values within the range of interest which could have existed but were missed. The missing values should not appear in the index at least until the transaction which missed them has terminated unless they are inserted by the Reader transaction itself. It is possible that the current insert transaction itself is the one that had earlier performed the read of the next entry. When this is the case, the lock manager via a return code on the IX-Lock request indicates that an S-Lock or SIX-Lock is already being held on the next entry by the current transaction. Then, the Reader-Come-Inserter's next entry's S-Lock must be added on the entry to be inserted. This is called lock state replication via next key locking. The missed-you note is replicated on to the new entry in order to make sure that the newly inserted entry does not hide the missed-you note and thereby permit the insertion by another transaction of another entry behind the newly inserted entry. Such an insertion would not have been possible if the first transaction had not performed the insert key action which hid the original missed-you note. Thus, the ordinarily obtained IX-Lock on the inserted entry is changed to be SIX if the next entry is already held in the S-Mode or SIX-Mode by the current transaction. This replication would not be necessary if the newly inserted Key Value is smaller than the missed value, but the Inserter cannot benefit from this observation since it cannot find out what the missed value is or was.

If the Local Index is a Unique Index then make sure that there is no uncommitted delete by another transaction of another entry with the same Key Value as the one to be inserted. The Deleter of an entry gets an SIX-Lock on the next entry. If this is a Unique Index and the same transaction had earlier deleted another instance of the same Key Value then letting the current insert action happen will not cause problems because the previous delete of this transaction will not be undone without the current insert transaction first being undone. It should be appreciated that this is a result of the fact that the ROLLBACK must be performed in reverse chronological order.

If a Global Index exists on a Local Index and in this index there exists no other instance of the Key Value to be inserted then make sure that there is no uncommitted delete by another transaction of another entry with the same Key Value. A Deleter of an entry gets an SIX-Lock on the next entry. If currently another instance of the Key Value is in the uncommitted deleted state by another transaction T1, the current transaction T2 should not be permitted to perform its insert action because allowing the insert will cause T2 to insert that Key Value into the Global Index. After that, T1 may ROLLBACK thereby putting back the same Key Value in the Global Index, (T1 would have deleted that entry in forward processing). Thus, there would be duplicate entries in the Global Index for the same Key Value and the same partition when it should NOT contain any such duplicates.

If a Global Index exists on this Non-Unique Local Index and in this index if the next entry's Key Value is the same as the Key Value of the entry to be inserted then ensure that the first instance of that key value is not in the uncommitted state due to another transaction in progress. If the first instance is in the uncommitted state then only the transaction that inserted that instance could have inserted the next entry and that transaction would be holding X-Locks on all existing instances. If the current transaction is the one that inserted the first instance of the Key Value to be inserted then the return code from the lock manager, when the INSTANT IX-Lock is requested on the next entry, will indicate that the current transaction already holds an X-Lock on the entry. In this case, the current transaction will also obtain an X-Lock on the Index Entry being inserted. This is called the left side propagation of the uncommitted first instance. This is not necessary if the Local Index is a Unique Index. In that case, the first Inserter needs to get only an IX-Lock and the one attempting a subsequent insert transaction would request an S-Lock on the already existing entry to decide whether there is a Unique-Key violation. Before a Unique-Key violation can be reported it must be determined that either the first instance is in the committed state or that it is an insert by the current transaction.

The reason for not permitting, in a Non-Unique Local Index, an insert key action by a second transaction T2 when the first transaction T1's insert of the first instance is not yet committed has to do with the Local Index becoming inconsistent with respect to the Global Index if T1 were to ROLLBACK and T2 were to commit. T1, which inserted an entry in the Global Index during its insert of the Key Value in the Local Index, would undo its insert action to the Global index even though T2 which did not perform any insert in the Global Index commits. T2 did not perform any insert in the Global Index because its insert in the Local Index was not the first instance of that Key Value thereby leaving behind its Key Value in the Local Index without a corresponding entry in the Global Index.

With respect to the locking protocol of the previous entry, the reasons are as follows. The intent is to exploit the COMMIT_LSN idea if it is needed to ensure that the Inserter of the first instance of the Key Value being inserted has committed or to determine that the first instance of the Key Value is an uncommitted insert action by the current transaction itself. Even if this is not the first instance of the Key Value being inserted and the next entry's locking is not providing enough information to conclude that the first instance's insert transaction must have committed thereby requiring one to deal with the previous entry, one is still able to avoid an extra lock on the previous entry if the COMMIT_LSN method helps to determine that the previous entry is in the committed state. If the insert transaction of that first instance is not yet committed then it must be the case that all the other instances of that Key Value are also uncommitted inserts by the same transaction. Further, that transaction must be holding X-Locks on all the index entries with the same Key Value. If the current transaction is the one that inserted the first instance of the Key Value to be inserted then the return code from the lock manager when the INSTANT IS-Lock is requested on the previous entry will indicate that the current transaction already holds an X-lock on the previous entry. In this case, the current transaction will also obtain an X-Lock on the Index Entry being inserted. This is called the right side propagation or the uncommitted first instance information. For Unique Indexes, there is no need to deal with the problem.

The current entry lock pseudocode used determines what kind of lock needs to be acquired on the entry being inserted. At least an IX-Lock needs to be acquired on the inserted entry to ensure that other transactions do not read uncommitted data. It is assumed that Readers who do not want to read uncommitted data get S-Locks. It is also used to ensure that Deleters do not create a tombstone on an uncommitted entry since such a tombstone will disappear if the uncommitted entry's inserting transaction were to ROLLBACK its insert.

The reasons for acquiring the lock of the next entry during a delete action are as follows. It is important during a key delete to leave behind a tombstone to let other Reader transactions know that there is an uncommitted delete. It is assumed that Readers request an S-Lock. The lock on the tombstone (next entry) must be such that no other transaction is able to (1) hide the tombstone from the place where the delete action happened by inserting an entry with a Key Value higher than the deleted Key Value behind the tombstone entry and (2) eliminate the tombstone by deleting it. In the first instance of hiding the tombstone, it is taken care of by making Inserters acquire an INSTANT IX-Lock on the next entry. In the second instance of eliminating the tombstone, it is taken care of by making Deleters acquire an X-Lock on the to-be-deleted entry. If the same transaction that performed the original delete action inserts an entry behind the tombstone then it finds out about the original tombstone via the lock manager return code on the next entry lock during insert. Then it replicates the tombstone on the newly inserted entry by acquiring an SIX or X-Lock on the new entry instead of the usual IX-Lock. If the tombstone is being deleted by the same transaction then the tombstone gets replicated on the entry next to the original tombstone due to the SIX-Lock that is acquired on the next entry during the delete. If the Local Index is a Unique Index then the next entry lock lets a potential future Inserter of the same Key Value know about the uncommitted delete action involving that Key Value. As discussed before, Inserters get an IX-Lock on the next entry.

If the next entry's Key Value is the same as that of the to-be-deleted entry then ensure that at least one instance of that Key Value will not be deleted by any other transaction until the current transaction terminates. No future action by another transaction can delete the next entry since a Deleter gets an X-Lock on the to-be-deleted entry. If the next entry is currently in the uncommitted state its Inserter will now be holding an IX or X-Lock on it. This is needed to ensure that one does not get into a situation where transaction T1 deletes a non-last instance and T2 deletes the last instance, removes the Key Value from the Global Index, and then commits. T1 rolls back thereby reinserting that Key Value into the Local Index. Under these conditions the Local Index's Key Value will not be present in the Global Index.

If the only instance of a Key Value is being deleted then ensure that no other transaction is able to insert any instances of that Key Value until the deleting transaction terminates. This is ensured since an Inserter gets an IX-Lock on the next entry. What is desired by this step is to avoid the following scenario. T1 deletes the last instance from a Local Index and removes the Key Value from the Global Index. T2 then inserts the first instance of the Local Index and inserts the Key Value into the Global Index. T1 rolls back and introduces a duplicate entry in the Global Index since it will undo its earlier delete action from the Global Index. If T1 avoids inserting the duplicate and terminates then T2 may ROLLBACK thereby creating an inconsistency between the Local and Global Indexes since T2 removes the Key Value that it inserted into the Global Index.

The reasons for acquiring a lock on the previous entry during a delete is as follows. The intent is to see if there exists currently in the index at least one instance of the Key Value being deleted that is in the committed state or to determine that all the existing instances of that Key Value are uncommitted inserts by the current transaction. If the current transaction is not deleting the only instance of the Key Value and therefore does not have to delete an entry from the Global Index then the current transaction has to make sure that later all the remaining instances of the Key Value do not get deleted because they were all uncommitted inserts and all the inserting transactions rolled back those inserts erroneously leaving behind the Key Value in the Global Index. If all the remaining instances of the Key Value are uncommitted inserts of transactions other than the current one then the current transaction has to wait by requesting an S-Lock on the previous entry until at least one of those transactions terminates and check the state of the keys once again. Note that the fact that the S-Lock on the previous entry cannot be granted right away does not necessarily mean that the previous entry is an uncommitted insert. Other transactions may currently hold a lock on the previous entry which conflicts with the requested S-Lock. Therefore waiting on those conditions is a conservative approach.

Furthermore, if the current transaction is the one that inserted the previous entry and possibly all other instances of the Key Value then the current transaction can safely delete the current entry because if the current transaction rolls back then it will re-insert the current entry. As a result, there will be no need to modify the Global Index. On the other hand, if the current transaction were to subsequently delete in forward processing all the other instances then it will at that time delete the corresponding entry in the Global Index.

The locking protocol for index entries is summarized in the following tables.

locking rules of the key value locking protocol which is summarized in the following tables.

| Summary of Entry Locking for Non-Unique Local Indexes | | | |
|---|---|---|---|
| | NEXT ENTRY | PREVIOUS ENTRY | CURRENT ENTRY |
| Repeatable READ | — | — | Commit S |
| INSERT | Instant IX | Instant IS<br>IF (global index exists) AND<br>(next ≠ current) AND<br>(prev = current) AND<br>(LSN of prev page ≧ Commit_LSN) | Commit {X, SIX, IX}<br>X   IF (first instance) OR<br>    (prev held in X) OR<br>    (next held in X)<br>SIX  IF (next held in S or SIX)<br>IX  Otherwise |
| DELETE | Commit SIX | Instant S<br>IF (global index exists) AND<br>(next ≠ current) AND<br>(prev = current) AND<br>(LSN of prev page ≧ Commit_LSN) | Instant X |

| Summary of Entry Locking for Unique Local Indexes | | |
|---|---|---|
| | NEXT ENTRY | CURRENT ENTRY |
| Repeatable READ | — | Commit S |
| INSERT | Instant IX | Commit {SIX, IX}<br>SIX  IF (next held in S, SIX or X)<br>IX  Otherwise |
| DELETE | Commit SIX | Instant X |

| Summary of Entry Locking for Unique and Non-Unique Global Indexes | | |
|---|---|---|
| | NEXT ENTRY | CURRENT ENTRY |
| Repeatable READ | — | Commit S |
| INSERT | Instant IX | Commit {SIX, IX}<br>SIX  IF (next held in S, SIX or X)<br>IX  Otherwise |
| DELETE | Commit SIX | Instant X |

Based on the explanations given for the entry locking protocols, it should be easy to see the reasons behind the

| Summary of Key-Value Locking for Non-Unique Local Indexes | | |
|---|---|---|
| | NEXT KEY VALUE | CURRENT KEY VALUE |
| Repeatable READ | — | Commit S |
| INSERT | Instant IX<br>IF (first instance) | Commit {X, IX}<br>X  IF (first instance)<br>IX  Otherwise |
| DELETE | Commit SIX<br>IF (only instance) | {Instant, Commit} X<br>Instant  IF (only instance)<br>Commit  Otherwise |

| Summary of Key-Value Locking for Unique Local Indexes | | |
|---|---|---|
| | NEXT KEY VALUE | CURRENT KEY VALUE |
| Repeatable READ | — | Commit S |
| INSERT | Instant IX | Commit {SIX, IX}<br>SIX  IF (next held in S, SIX or X)<br>IX  Otherwise |
| DELETE | Commit SIX | Instant X |

Summary of Key-Value Locking for Non-Unique Global Indexes

|  | NEXT KEY VALUE | CURRENT KEY VALUE | |
|---|---|---|---|
| Repeatable READ | — | Commit S | |
| INSERT | Instant IX | Commit {SIX, IX} | |
|  | IF (first instance) | SIX | IF (next held in S, SIX or X) |
|  |  | IX | Otherwise |
| DELETE | Commit SIX | {Instant, Commit} X | |
|  | IF (definitely or possibly only instance) | Instant | IF (definitely only instance) |
|  |  | Commit | Otherwise |

Summary of Key-Value Locking for Unique Global Indexes

|  | NEXT KEY VALUE | CURRENT KEY VALUE | |
|---|---|---|---|
| Repeatable READ | — | Commit S | |
| INSERT | Instant IX | Commit {SIX, IX} | |
|  |  | SIX | IF (next held in S, SIX or X) |
|  |  | IX | Otherwise |
| DELETE | Commit SIX | Instant X | |

In summary, a novel multi-tiered indexing method is provided for a partitioned data direct in a parallel or distributed database system which has a Local Index created and maintained for each partition of the object and a Coarse Global Index is optionally created and maintained. The Coarse Global Index identifies the indexed partition(s) by partition identifiers (PIDs). The Coarse Global Index associates the individual Index Key values with their target partitions so that an access request with a highly partition-selective search predicate on the Index Key can be quickly and easily directed to the target partition(s) for processing. An index maintenance locking protocol is also provided which assures the consistency between the Local Index entries and the Coarse Global Index entries during concurrent index accesses by different transactions. The locking protocol handles the insertion and deletion of index entries simply and efficiently. The locking protocol for both the unique and non-unique Local Index schemes that minimizes locking only to those cases involving an inserted or deleted key and to the key following and possibly the key preceding the inserted or deleted key allows very high concurrency between simultaneous Readers, Inserters, and Deleters. An insert or delete operation that needs to be performed on the Coarse Global Index can be initiated only after all the locking required for performing the corresponding Local Index operation has been completed in order to correctly determine whether in fact the Coarse Global Index update operation is required or not. The present method enhances the efficiency of complex query evaluation and index maintenance, and attains a high throughput for transaction processing.

The invention may be embodied in other specific forms without departing from its spirit or essential characteristics. The above-described embodiments of the present invention are to be considered in all respects only as illustrative and not restrictive in scope. The scope of the invention is, therefore, indicated by the appended claims rather than by the above-detailed description. Therefore, all changes which come within the meaning and range of equivalency of the claims are to be considered embraced within their scope.

What is claimed and desired to be secured by United States Letters Patent is:

1. A method for maintaining consistency between a second index table and a first index table in a multi-tiered index structure to handle the insertion of an index entry into a unique index, the multi-tiered index structure including a respective second index table of index key values corresponding with each respective partition of a partitioned database and a first index table containing at least one unique first index entry for each index key value in each of the respective second index tables, i) wherein the second index table has a second index identifier and contains second index entries, each of the second index entries having an identifier which identifies an object in the respective database partition corresponding with the second index table, and having a second index key value which relates to the identified object, at least some of the index key values being distinct, and ii) wherein the first index table has at least one first index entry for each distinct one of the second index key values in each second index table, each of the first index entries having a second index identifier which identifies a second index table, and having a first index key value which relates to one of the second index key values in the identified second index table, the method comprising the computer-implemented steps of:

A) determining if the second index key value in the index entry to be inserted is already present in the second index table;

B) if the second index key value in the index entry to be inserted is already present in the second index table, then rejecting the insertion; and C) if the second index key value in the index entry to be inserted is not already present in the second index table, then performing the steps of:

1) inserting the index entry into the second index table;

2) determining if the first index key value which relates to the second index key value is already present in the first index table, and 3) if the first index key value which relates to the second index key value is already present, performing the steps of:

i) deleting the inserted second index entry from the second index table; and ii) rejecting the insertion;

4) determining if the first index key value which relates to the second index key value is present in the first index table, and, 5) if the first index key value which relates to the second index key value is not present, then inserting, into the first index table,
  i) a first index entry having a first index key value relating to the second index key value; and
  ii) a second index identifier identifying the second index table.

2. A method for maintaining consistency between a second index table and a first index table in a multi-tiered index structure to handle the deletion of an index entry in a unique index, the multi-tiered index structure including a respective second index table of index key values corresponding with each respective partition of a partitioned database and a first index table containing at least one unique first index entry for each index key value in each of the respective second index tables,
  i) wherein the second index table has a second index identifier and contains second index entries, each of the second index entries having an identifier which identifies an object in the respective database partition corresponding with the second index table, and having a second index key value which relates to the identified object, at least some of the index key values being distinct, and
  ii) wherein the first index table has at least one first index entry for each distinct one of the second index key values in each second index table, each of the first index entries having a second index identifier which identifies a second index table, and having a first index key value which relates to one of the second index key values in the identified second index table,
the method comprising the computer-implemented steps of:
  a) determining if the second index key value in an index entry to be inserted is already present in the second index table; and
  b) if the second index key value is not already present, then performing the steps of:
    1) deleting the index entry from the second index table; and
    2) deleting from the first index table the first index entry relating to the second index key value and the second index identifier.

3. A method for maintaining consistency between a second index table and a first index table in a multi-tiered index structure to handle the insertion of an index entry into a non-unique index, the multi-tiered index structure including a respective second index table of index key values corresponding with each respective partition of a partitioned database and a first index table containing at least one unique first index entry for each index key value in each of the respective second index tables,
  i) wherein the second index table has a second index identifier and contains second index entries, each of the second index entries having an identifier which identifies an object in the respective database partition corresponding with the second index table, and having a second index key value which relates to the identified object, at least some of the second index key values being distinct, and
  ii) wherein the first index table has at least one first index entry for each distinct one of the second index key values in each second index table, each of the first index entries having a second index identifier which identifies a second index table, and having a first index key value which relates to one of the second index key values in the identified second index table,
the method comprising the computer-implemented steps of:
  a) determining if the second index key value in the index entry to be inserted is already present in the second index table; and
  b) if the second index key value in the index entry to be inserted is not already present, then:
    1) inserting the index entry into the second index table; and
    2) inserting into the first index table a first index entry having a first index key value relating to the second index key value and a second index identifier identifying the second index table.

4. A method for maintaining consistency between a second index table and a first index table in a multi-tiered index structure to handle the deletion of an index entry into a non-unique index, the multi-tiered index structure including a respective second index table of index key values corresponding with each respective partition of a partitioned database and a first index table containing at least one unique first index entry for each index key value in each of the respective second index tables,
  i) wherein the second index table has a second index identifier and contains second index entries, each of the second index entries having an identifier which identifies an object in the respective database partition corresponding with the second index table, and having a second index key value which relates to the identified object, at least some of the second index key values being distinct, and
  ii) wherein the first index table has at least one first index entry for each distinct one of the second index key values in each second index table, each of the first index entries having a second index identifier which identifies a second index table, and having a first index key value which relates to one of the second index key values in the identified second index table,
the method comprising the computer-implemented steps of:
  a) deleting the index entry from the second index table;
  b) determining if the second index key value in the index entry deleted is still present in the second index table; and
  c) if the second index key value in the index entry deleted is not present any longer, then deleting from the first index table a first index entry having a first index key value relating to the second index key value and a second index identifier identifying the second index table.

5. A method for generating a multi-tiered indexing structure for a partitioned database of objects, the database including a plurality of partitions, the method comprising the computer-implemented steps of:
  a) creating a respective second index table for each respective one of the partitions of the database wherein the second index table contains at least one second index entry for each object of interest in the respective partition of the database, the second index entry comprising:
    1) an object identifier identifying an object in the respective partition; and
    2) a second index key value which relates to the identified object; and
  b) creating a first index table containing at least one unique first index entry for each distinct second index key value in each of the respective second index tables, each of the first index entries comprising:
    1) a second index identifier which identifies a second index table; and 2) a first index key value which relates to a second index key value in the identified second index table.

6. A computer program product, for use in a partitioned computer database system of objects, the database system including a plurality of partitions, for generating a multi-tiered indexing on structure, the computer program product comprising:
   a) a magnetic recording medium for retaining a set of computer program instructions;
   b) means, recorded on said magnetic recording medium, for instructing said computer system to create a respective second index table for each respective one of the partitions of the database, wherein the second index table contains at least one second index entry for each object in the respective partition of the database, the second index entry comprising:
      i) an object identifier identifying an object in the respective partition; and
      ii) a second index key value which relates to the identified object; and
   c) means, recorded on said magnetic recording medium, for instructing said computer system to create a first index table containing at least one unique first index entry for each distinct second index key value in each of the respective second index tables, the first index entry comprising:
      i) a second index identifier which identifies a second index table; and
      ii) a first index key value which relates to a second index key value in the identified second index table.

7. A computer program product for use in a partitioned computer database system of objects for maintaining consistency between a second index table and a first index table in a multi-tiered index structure to handle the insertion of an index entry into a unique index, the multi-tiered index structure including a respective second index table of index key values corresponding with each respective partition of a partitioned database and a first index table containing at least one unique first index entry for each index key value in each of the respective second index tables,
   i) wherein the second index table has a second index identifier and contains second index entries, each of the second index entries having an identifier which identifies an object in the respective database partition corresponding with the second index table, and having a second index key value which relates to the identified object, at least some of the second index key values being distinct, and
   ii) wherein the first index table has at least one first index entry for each distinct one of the second index key values in each second index table, each of the first index entries having a second index identifier which identifies a second index table, and having a first index key value which relates to one of the second index key values in the identified second index table,
the computer program product comprising:
   a) a magnetic recording medium for retaining a set of computer program instructions;
   b) means, recorded on said magnetic recording medium, for instructing said computer system to determine if the second index key value in the index entry to be inserted is already present in the second index table;
   c) means, recorded on said magnetic recording medium, for instructing said computer system to reject the insertion, the means for directing to reject being operable if the second index key value in the index entry to be inserted is already present; and
   d) means, recorded on the magnetic recording medium and operable if the second index key value in the index entry to be inserted is not already present in the second index table, for instructing said computer system:
      i) to insert the index entry into the second index table;
      ii) to determine if the first index key value which relates to the second index key value is already present in the first index table,
      iii) if the first index key value which relates to the second index key value is already present, to delete the inserted second index entry from the second index table,
      iv) to reject the insertion;
      v) to determine if the first index key value which relates to the second index key value is present in the first index table; and
      vi) if the first index key value which relates to the second index key value is not present, then inserting into the first index table a first index entry having a first index key value relating to the second index key value and a second index identifier identifying the second index table.

8. A computer program product for use in a partitioned computer database system of objects for maintaining consistency between a second index table and a first index table in a multi-tiered index structure to handle the deletion of an index entry in a unique index, the multi-tiered index structure including a respective second index table of index key values corresponding with each respective partition of a partitioned database and a first index table containing at least one unique first index entry for each index key value in each of the respective second index tables,
   i) wherein the second index table has a second index identifier and contains second index entries, each of the second index entries having an identifier which identifies an object in the respective database partition corresponding with the second index table, and having a second index key value which relates to the identified object, at least some of the second index key values being distinct, and
   ii) wherein the first index table has at least one first index entry for each distinct one of the second index key values in each second index table, each of the first index entries having a second index identifier which identifies a second index table, and having a first index key value which relates to one of the second index key values in the identified second index table,
the computer program product comprising:
   a) a magnetic recording medium for retaining a set of computer program instructions;
   b) means, recorded on said magnetic recording medium, for instructing said computer system to determine if the second index key value in an index entry to be inserted is already present in the second index table; and
   c) means, operable if the index entry to be inserted is not already present, recorded on said magnetic recording medium, for instructing said computer system:
      i) to delete the index entry from the second index table; and
      ii) to delete, from the first index table, the first index entry relating to the second index key value and the second index identifier.

9. A computer program product for use in a partitioned computer database system of objects for maintaining consistency between a second index table and a first index table in a multi-tiered index structure to handle the insertion of an index entry into a non-unique index, the multi-tiered index structure including a respective second index table of index key values corresponding with each respective partition of a partitioned database and a first index table containing at least one unique first index entry for each index key value in each of the respective second index tables, i) wherein the second index table has a second index identifier and contains second index entries, each of the second index entries having an identifier which identifies an object in the respective database partition corresponding with the second index table, and having a second index key value which relates to the identified object, at least some of the second index key values being distinct, and ii) wherein a first index table has at least one first index entry for each distinct one of the second index key values in each second index table, each of the first index entries having a second index identifier which identifies a second index table, and having a first index key value which relates to one of the second index key values in the identified second index table, the computer program product comprising:

a) a magnetic recording medium for retaining a set of computer program instructions;

b) means, recorded on said magnetic recording medium, for instructing said computer system to determine if the second index key value in an index entry to be inserted is already present in the second index table; and c) means, operable if the second index key value in the index entry to be inserted is not already present in the second index table, recorded on said magnetic recording medium, for instructing said computer system:

i) to insert the index entry from the second index table; and ii) to insert into the first index table a first index entry having a first index key value relating to the second index key value and a second index identifier identifying the second index table.

10. A computer program product for use in a partitioned computer database system of objects for maintaining consistency between a second index table and a first index table in a multi-tiered index structure to handle the deletion of an index entry in a unique index, the multi-tiered index structure including a respective second index table of index key values corresponding with each respective partition of a partitioned database and a first index table containing at least one unique first index entry for each index key value in each of the respective second index tables, i) wherein the second index table has a second index identifier and contains second index entries, each of the second index entries having an identifier which identifies an object in the respective database partition corresponding with the second index table, and having a second index key value which relates to the identified object, at least some of the second index key values being distinct, and ii) wherein the first index table has at least one first index entry for each distinct one of the second index key values in each second index table, each of the first index entries having a second index identifier which identifies a second index table, and having a first index key value which relates to one of the second index key values in the identified second index table, the computer program product comprising:

a) a magnetic recording medium for retaining a set of computer program instructions;

b) means, recorded on said magnetic recording medium, for instructing said computer system to delete the index entry from the second index table;

c) means, recorded on said magnetic recording medium, for instructing said computer system to determine if the second index key value in the index entry deleted is still present in the second index table; and d) means, operable if the second index key value in the index entry deleted is not present any longer, recorded on said magnetic recording medium, for instructing said computer system to delete from the first index table a first index entry having a first index key value relating to the second index key value and a second index identifier the second index table.

11. A partitioned database computer system comprising:

a) a processor for processing information within said partitioned database computer system:

b) at least two respective data storage devices, the database computer system being configured as at least two respective partitioned database subsystems divided by at least one database partition;

c) database management means for reading and updating database information from said at least one database disk; and d) a multi-tiered indexing structure comprising:

i) a respective second index table for each respective one of the partitions, each respective one of the index tables having at least one second index entry for each object in the respective one of the partitions, each second index entry comprising:
         an object identifier identifying an object in the respective partition; and
         a second index key value which relates to the identified object; and ii) a first index table having at least one unique first index entry for each distinct second index key value in each of the respective second index tables, each first index entry comprising:
         a second index identifier which identifies a second index table; and
         a first index key value which relates to a second index key value in the identified second index table.

* * * * *

UNITED STATES PATENT AND TRADEMARK OFFICE
CERTIFICATE OF CORRECTION

| | | |
|---|---|---|
| PATENT NO. | : 5,551,027 | Page 1 of 1 |
| APPLICATION NO. | : 08/526723 | |
| DATED | : September 27, 1996 | |
| INVENTOR(S) | : David M. Choy | |

It is certified that error appears in the above-identified patent and that said Letters Patent is hereby corrected as shown below:

Title Page; should read;

Please amend section [63] on the face of the patent as shown:

--Continuation of Ser. No. 08/001,491, Jan. 7, 1993, abandoned.--

Signed and Sealed this

Eighteenth Day of May, 2010

David J. Kappos
*Director of the United States Patent and Trademark Office*